UNITED STATES PATENT OFFICE.

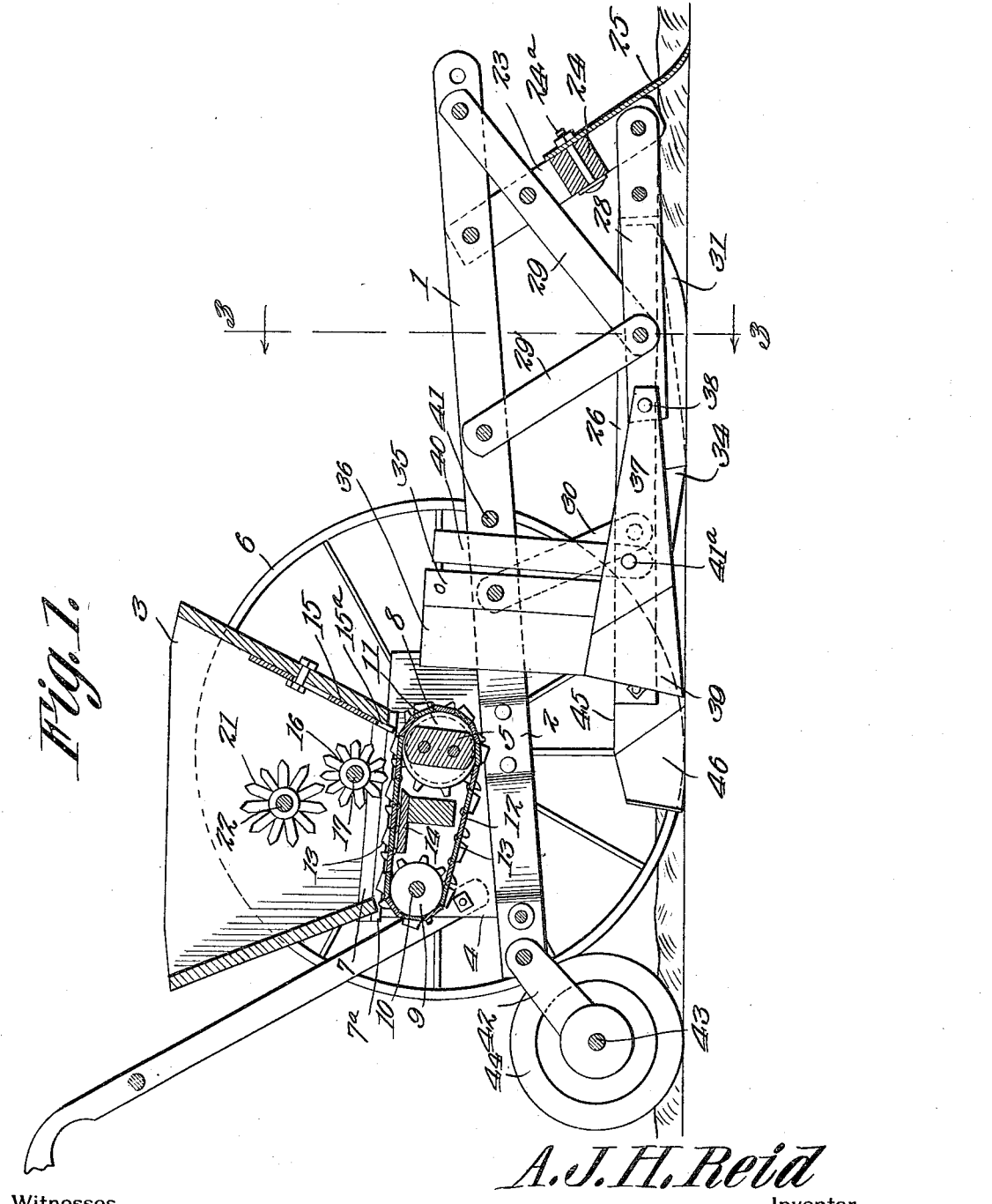

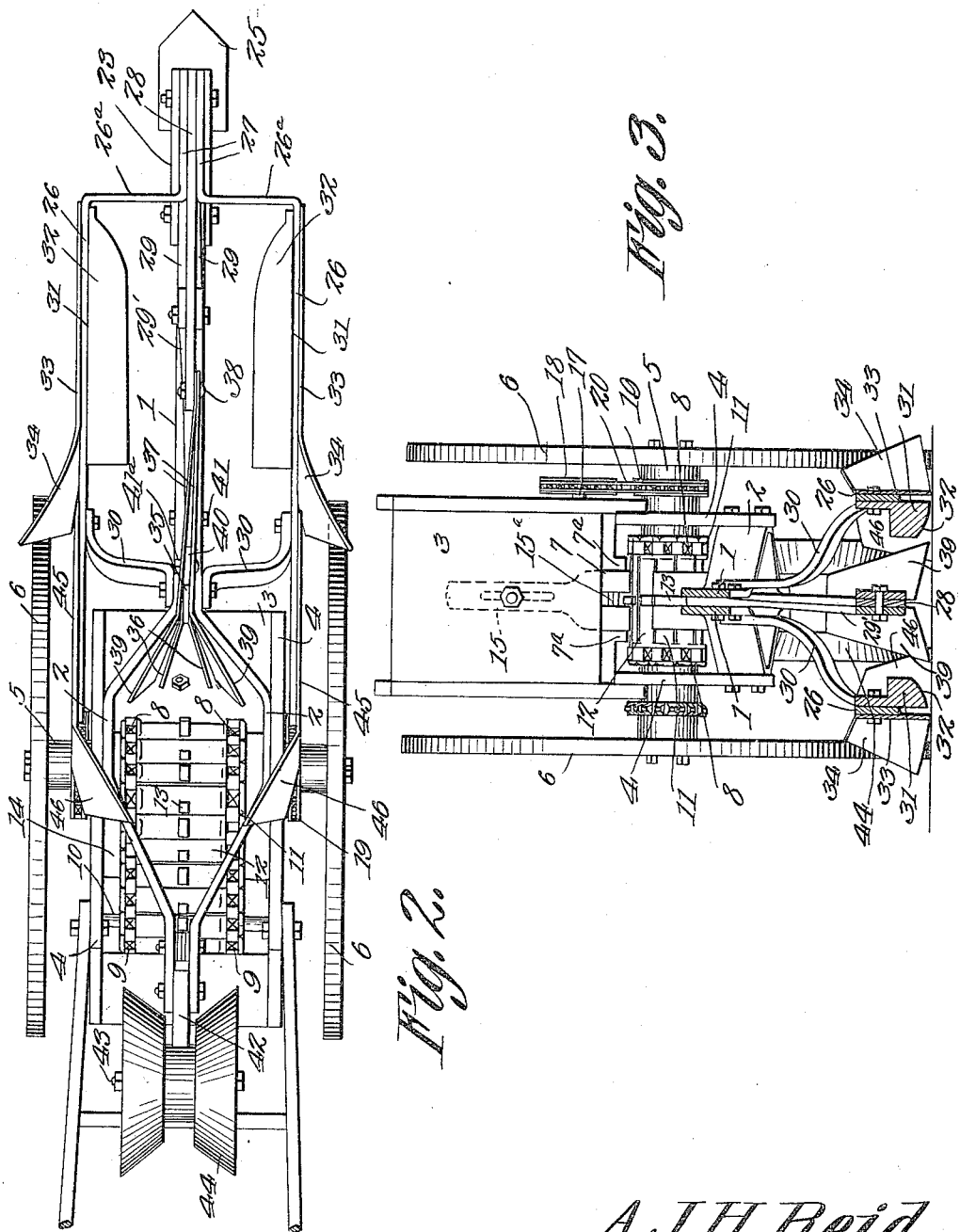

ALFRED JERE HORN REID, OF HENDERSON, TENNESSEE.

SEED-PLANTER.

1,137,901. Specification of Letters Patent. Patented May 4, 1915.

Application filed June 8, 1914. Serial No. 843,820.

*To all whom it may concern:*

Be it known that I, ALFRED J. H. REID, a citizen of the United States, residing at Henderson, in the county of Chester and State of Tennessee, have invented a new and useful Seed-Planter, of which the following is a specification.

The present invention appertains to seed planters and is particularly an improvement over the planter disclosed in my Patent No. 976,292, issued November 22, 1910.

The present invention contemplates the provision of a machine for planting cotton seed, corn, peas, and other seeds, and which machine will be improved in its construction and details, to enhance the utility of the machine.

One of the objects of the present invention is to provide a seed planter having unique seed bed working means.

Another object of the present invention is to provide novel means for discharging the seed from the hopper.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention has been illustrated in its preferred embodiment in the accompanying drawings, wherein:—

Figure 1 is a longitudinal section of the improved seed planter. Fig. 2 is a bottom view of the planter. Fig. 3 is a transverse or cross section taken on the line 3—3 of Fig. 1.

The frame of the present structure includes a longitudinal beam comprising a pair of bars 1, which are juxtaposed, and which are spread apart adjacent their rear ends, as at 2.

The hopper 3 is disposed above the spaced or separated portions 2 of the bars 1, or above the opening formed by the said portions 2, and the sides of the hopper 3 are provided with depending extensions or plates 4 secured to the outer sides of the portions 2, to support the hopper in place.

The axle 5, which is formed of two inner sprocket wheels 8, two outer sprocket wheels 19, spacing washers between the sprocket wheels, and a pair of bolts engaged therethrough, is journaled through the extensions or plates 4 below the front wall of the hopper 3 and above the portions 2, the ground wheels 6 being secured by the said bolts to the ends of the axle at the sides of the hopper and the portions 2 of the beam 1—1. The bottom of the hopper 3 is provided with a longitudinal slot or opening 7 forming the seed channel, and the hopper bottom is further provided with depending flanges or lips 7ª along the edges of the slot or opening 7, for the purpose which will hereinafter appear.

The seed discharging or dropping device embodies a pair of sprocket wheels 8 mounted upon the axle 5 between and adjacent the respective offset or separated portions 2, below the front wall of the hopper, and a pair of idler sprocket wheels 9 secured upon a countershaft 10 journaled through the hopper extensions or plates 4 below the rear wall of the hopper thereover, an endless conveyer of the nature disclosed in the above mentioned patent. This conveyer, which is of a double sprocket chain type, embodies a pair of endless sprocket chains 11 trained over the respective sprocket wheels 8 and 9 and having their links connected by bars 12, which form a continuous flexible apron between the sprocket chains 11. The bars 12 are provided with outstanding lugs 13 of suitable character, such as that disclosed in the said patent, the lugs 13 being arranged to receive the seed and to carry the same forwardly along the seed channel 7. The endless conveyer has its upper run working directly below the slot or channel 7, the depending flanges 7ª fitting snugly upon the upper run of the conveyer within the sprocket chains 11, to prevent the escape of seed over the sides of the conveyer.

The upper run of the conveyer is preferably supported by a cross piece 14 terminally secured to the extensions or plates 4, whereby the upper run of the conveyer will be supported under the weight of the seed, and will travel properly along the slot or channel 7, for the purposes intended.

A vertically adjustable gage 15 is carried by the front wall of the hopper 3, and has its lower end coöperating with the forward portion of the conveyer, to control the discharge of the seed, and to close the forward end of the slot or channel 7, the lower end of the gage 15 being provided with a notch or opening 15ª through which the conveyer lugs 13 are arranged to pass to carry the seed outwardly.

Within the hopper 3, is an agitating device, which embodies a star-shaped agitator 16 secured upon a transverse shaft 17 journaled through the sides of the hopper 3, adjacent the bottom of the hopper, the radial arms of the agitator 16 working close to the upper run of the conveyer and coöperating with the lugs 13 to assist in working the seed between the lugs as the agitator is rotated. To rotate the agitator 16, a sprocket wheel 18 is secured upon one projecting end of the agitator shaft 17, and a sprocket wheel 19 is secured upon the axle 5 adjacent one ground wheel 6, a sprocket chain 20 being trained over the sprocket wheels 18 and 19, whereby the agitator shaft will be rotated. An agitator 21, similar to the agitator 16, is also mounted within the hopper 3, above the agitator 16, and has its arms arranged to be engaged by the free ends of the arm of the agitator 16. The agitator 21 is mounted upon a transverse shaft 22 journaled through the sides of the hopper 3, the agitator 21 being idle, and being rotated by the agitator 16 due to the fact that the arms or fingers of the two agitators interdigitate.

A furrow opening device is carried by the forward end of the frame, and to this end a pair of rearwardly inclined bars 29 have their upper ends secured to the outer sides of the bars 1 adjacent the forward ends of the said bars 1, and a block or slide 24 is slidably mounted between the bars 23 which form a plow foot or standard. A clamping bolt 24ª is engaged through the block or slide 24 and is arranged to clamp the plow share or blade 25 against the forward edges of the bars 23, the block or slide 24 being adjustable vertically when the bolt 24ª is loosened, as will be obvious, to thereby adjust the vertical position of the plow share or blade 25. The plow share 25 is preferably of the middle burster type, to open the furrow. The plow share or blade 25 projects below the standard or foot 23—23.

The frame of the machine further includes a pair of lower longitudinal spaced side bars 26, which have their forward ends offset toward each other, as at 27, and secured between the lower ends of the standard bars 23, a central longitudinal bar 28 also having its forward ends secured between the forward ends 27 of the bars 26 and the lower ends of the standard bars 23. A forwardly inclined bar or brace 29 has its upper end secured between the forward end portions of the beam bars 1, has its intermediate portion secured between the standard bars 23 adjacent the bars 1, and has its lower end secured to one side of the lower bar 28 adjacent its rear end. A rearwardly inclined brace 29′ has its lower end secured to the other side of the bar 28 opposite the lower end of the brace 29 and has its upper end secured between the bars 1. A pair of rearwardly inclined braces 30 have their lower ends secured to the bars 26 adjacent their rear ends, and have their upper ends secured to the remote or outer sides of the bars 1 adjacent the forward ends of the portions 2.

A pair of shoes or runners 31 are secured to the inner sides of the bars 26 adjacent the transverse portions 26ª of the bars 26 formed by the offset ends 27. The shoes or runners 31 are inclined forwardly and have their lower or tread portions inclined inwardly, as at 32, to provide deflectors trailing in rear of the plow share 25 and at the sides of the furrow made by the plow share.

Plates 33 are secured to the outer sides of the bars 26 adjacent the shoes or runners 31 and have diverging wings 34 at their rear ends forming deflectors in advance of the ground wheels 6 and adapted to throw the soil to the opposite sides in advance of the ground wheels, to provide the furrows in which the ground wheels may run.

The seed chute or boot comprises an upright bar 35 secured between the bars 1 of the beam and between the upper ends of the braces 30, and upright rearwardly diverging plates or wings 36 secured to the sides of the bar 35 and projecting toward the edges of the conveyer to receive the seed ejected forwardly from the conveyer.

A secondary or auxiliary furrow opening device is provided in rear of the plow share 25, and which is somewhat sword-shaped in form. The secondary furrow opening device includes a pair of plates 37 which have their forward ends pivoted to the rear end of the bar 28.

The sprocket wheels 8 and 9 are disposed adjacent the extensions or plates 4, and have trained as at 38, and which diverge at a relatively small acute angle, to the rear, the rear ends of the plates 37 being bent angularly to provide deflectors or wings 39 arranged at a larger acute angle with respect to one another, than the body portions of the plates 37. The deflectors or wings 39 diverge directly in advance of the lower ends of the wings 36 of the chute or boot, and the deflectors or wings 39 project or extend below the chute or boot, to open the furrow directly in advance of the chute or boot.

The secondary furrow opener is adapted to be adjusted vertically, and to this end, a hanger 40 has its lower end pivoted, as at 41ª, between the body portions of the plates 37 and has its upper end clamped between the bars 1, by means of a clamping bolt 41 connecting the said bars directly in advance of the hanger. Thus, when the bolt 41 is loosened, the hanger 40 may be adjusted vertically to swing the furrow opener 37—36 vertically so as to properly adjust the deflectors or wings 39 according to the depth of furrow desired.

The rear end of the machine is provided with a furrow closer and packer, which embodies a link 42 pivoted between the rear ends of the bars 1, and having an axle 43 journaled through its lower or free end. The axle 43 includes a bolt having suitably spacing washers thereon. Wheels 44 are secured upon the ends of the axle or bolt 43 and have their peripheries beveled inwardly, to thereby provide a rotary furrow closer and packer having an annular or circumferential recess arranged to move over the furrow. The furrow closer and packer 44—44 is arranged to trail at the rear of the machine.

To assist in closing the furrow, plates 45 are secured to the outer sides of the bars 26 at the rear ends of the said bars, and the rear ends of the plates 45 are provided with converging or inwardly directed deflectors or wings 46 in rear of the wings or deflectors 39 and adapted to direct the soil back into the furrow opened by the deflectors or wings 39.

In operation, supposing the hopper 3 to be filled with the seed which is to be planted, the planter or machine may be drawn over the soil in the usual manner, by hitching the draft animal or animals to the forward end of the beam 1—1. Then, the plow share 25 will break open the soil, to provide the primary furrow, and the runners or shoes 31, in skidding or riding upon the soil turned by the plow share 25, will support the forward end of the machine, and at the same time, will direct the soil partially back into the furrow made by the plow share 25. The deflectors or wings 34 will direct the soil outwardly to the opposite sides to level the soil directly in advance of the ground wheels 6, whereby the said ground wheels will evenly and properly run astride the furrow made by the plow share 25, and within the furrow made by the deflectors 34. Thus, the plow share 25 and the shoes or runners 31 work the soil, to provide a seed bed, the seed furrow then being formed in the seed bed by the secondary furrow opener. The secondary furrow opener, constituting the plates 37 having the rear deflectors or wings 39 will form the seed furrow in a thoroughly efficient manner, due to the sword-shape of the secondary furrow opener, it also being noted that the secondary furrow opener may be adjusted vertically according to the depth of seed furrow desired.

As the ground wheels 6 turn within the furrows formed by the deflectors 34, they will rotate the sprocket wheels 8 in a clockwise direction, as seen in Fig. 1, to thereby move the upper run of the conveyer forwardly. Thus, the seed will be caught and conveyed forwardly by the lugs 13 of the upper run of the conveyer and will be ejected or discharged forwardly into the boot or chute 36—36. The seed is thus dropped in rear of the boot or chute into the seed furrow, the lugs 13 of the conveyer properly dropping the seed at spaced points, according to the requirements. The gage 15 may also be adjusted to regulate the discharge of seed as desired.

The axle 5 of the ground wheels being rotated, will also actuate the agitator 16 to thereby properly agitate the seed in order that it will enter the seed channel 7 to be taken up by the lugs 13 of the conveyer. The secondary agitator 21 will be actuated by the agitator 16, as will be obvious.

Immediately after the seed is dropped into the seed furrow, the furrow closing deflectors or wings 46 following the wings or deflectors 39, will direct the soil back into the seed furrow, to close the same, and to cover the seed, and then, the packer 44—44 in trailing in rear of the deflectors 46, will complete the closing of the seed furrow, and will form a transversely convexed ridge over the row of planted seeds, to assist in shedding water to the water furrows at the sides of the seed bed. The runners or shoes 31 also project below the bars 26, to support the said bars, above the soil to prevent interference.

From the foregoing, taken in connection with the drawings, the advantages and capabilities of the present machine will be obvious to those versed in the art, without further comment being necessary, it being noted, however, that the machine may be employed as a fertilizer distributer, if desired, or the machine may be provided with duplicate hoppers and discharge means for seed and fertilizer.

Having thus described the invention, what is claimed as new is:—

1. In a machine of the character described, a frame comprising an upper beam, lower spaced side bars having their forward ends offset toward one another, a lower central bar secured between the forward ends of the side bars, a standard connecting the forward ends of the said bars and the forward end portion of the beam, and braces connecting the said bars and beam, a plow share carried by the standard, deflectors secured to the said side bars in rear of the plow share for deflecting the soil inwardly, a seed furrow opener attached to the rear end of the central bar, a seed boot carried by the beam and depending in rear of the said furrow opener, and furrow closing deflectors carried by the rear ends of the side bars in rear of the said boot.

2. In a machine of the character described, a frame comprising an upper beam, lower spaced side bars having their forward ends offset toward one another, a lower central bar secured between the forward ends of the side bars, a standard connecting the forward ends of the said bars and the forward end portion of the beam, and braces connecting the said bars and beam, a plow share carried by the standard in front of the said lower central bar, runners secured to the said side bars in rear of the plow share and having deflectors for deflecting the soil inwardly, a seed furrow opener having its forward end pivoted to the rear end of the said central bar, means connecting the seed furrow opener and beam for holding the seed furrow opener at various vertical positions, the seed furrow opener having diverging deflectors at its rear end, a seed boot carried by the beam and depending in rear of the said deflectors of the seed furrow opener, and furrow closing deflectors carried by the rear ends of the side bars in rear of the boot.

In testimony that I claim the foregoing as my own, I have hereto affixed my signature in the presence of two witnesses.

ALFRED JERE HORN REID.

Witnesses:
G. W. PERKINS,
J. M. FRY.

Copies of this patent may be obtained for five cents each, by addressing the "Commissioner of Patents, Washington, D. C."